United States Patent [19]

Campbell et al.

[11] Patent Number: 4,943,762
[45] Date of Patent: Jul. 24, 1990

[54] POWER SUPPLY SYSTEM

[75] Inventors: W. Carroll Campbell; Michael W. Evans, both of Longmont; Edward A. Browning, Jr., Louisville; Robert J. Stone, Longmont, all of Colo.

[73] Assignee: Codar Technology, Inc., Longmont, Colo.

[21] Appl. No.: 149,116

[22] Filed: Jan. 27, 1988

[51] Int. Cl.$^5$ .............................................. G05F 1/56
[52] U.S. Cl. ..................................... 323/284; 323/276; 363/89
[58] Field of Search ................ 323/276, 278, 281, 282, 323/283, 284, 285, 287, 288, 266, 299; 363/80, 85, 86, 89

[56] References Cited

U.S. PATENT DOCUMENTS

| | | | |
|---|---|---|---|
| 3,740,569 | 6/1973 | Carcia | 323/276 X |
| 3,754,182 | 8/1973 | Morris et al. | 323/285 X |
| 4,288,831 | 9/1981 | Dolikian | 323/282 X |
| 4,804,923 | 2/1989 | Black | 363/89 X |

FOREIGN PATENT DOCUMENTS

| | | | |
|---|---|---|---|
| 0119779 | 7/1983 | Japan | 363/86 |
| 0648965 | 2/1979 | U.S.S.R. | 363/85 |

Primary Examiner—Patrick R. Salce
Assistant Examiner—Kristine Peckman
Attorney, Agent, or Firm—Rosen, Dainow & Jacobs

[57] ABSTRACT

A power supply control circuit, for control of the power supply, controls a solid state relay in series with the power input to the power supply. The power supply control circuit also generates control signals, indicating pending power failure, for the microcomputer arranged in a card cage.

15 Claims, 11 Drawing Sheets

FIG. 11

POWER SUPPLY SYSTEM

This invention relates to a microcomputer system and a power supply arrangement therefore, and is more particularly directed to a ruggedized microcomputer arrangement including power supply and control system for operation of a microcomputer. The arrangement of the invention is especially adapted to facilitate the use of microcomputers in hostile environments, as well as to ensure the protection of the microcomputer in the event of improper operating power, or loss of operating power. The arrangement of the invention is therefore particularly useful when it is desired to employ a microcomputer in the field.

Briefly stated, the arrangement in accordance with the invention provides a housing having air permeable front and rear panels. A receptacle for disk or tape drives is shock mounted adjacent to the front of the housing, the receptacle being open at its front and rear for the passage of cooling air. A power supply and a card cage are mounted laterally of one another at the rear of the housing. A cooling fan is mounted to pass cooling air in the front-to-back direction, through the air permeable front and back of the housing, and a circulating fan may be provided to circulate air transversely in the housing.

A power supply control circuit is provided for controlling the application of power to the power supply via a solid state relay. The power supply produces operating power for a microcomputer inserted in the card cage, and the power supply control circuit further produces signals for application of the microcomputer indicative of a pending power failure, to enable the microcomputer to take any necessary steps to avoid the loss of data.

In accordance with one feature of the invention, a sensing system is provided for producing an output signal responsive to the drop of a cyclic voltage below a determined level, comprising a timing circuit having an input circuit and an output circuit, a threshold circuit for applying triggering signals to the input circuit in response to instantaneous amplitudes of the cyclic voltage exceeding a predetermined level, and means coupling the output terminal to the threshold circuit as an input thereto. The timing circuit comprises means responsive to the triggering signal for maintaining the output terminal at a level exceeding the predetermined level for a predetermined time, whereby in the absence of a peak of the cyclic voltage exceeding the predetermined level for a predetermined time the voltage at the output terminal assumes a second level less than the predetermined level. The timing circuit may comprise a monostable multivibrator.

In a further feature in accordance with the invention, a power supply system is provided including an input circuit for receiving power, a power supply for converting power received by the input circuit, and a circuit for applying the output of the input circuit to the power supply. The applying circuit comprises a solid state relay having a circuit interconnecting the input circuit and power supply and a control circuit. The system further comprises first sensing means for producing a first output signal when the voltage of the output of the input circuit is outside of a determined range, and means for applying the first signal to the control circuit for disconnecting the power supply from the input circuit when the voltage output for the input circuit is outside of the range.

In this arrangement the control circuit may comprise a control diode, the means for applying the first signal comprising means for applying the first signal to one electrode of the control diode. The input circuit comprises means for applying a.c. to the solid state relay, and the system further comprises means for rectifying the a.c., and means deriving a voltage from the rectifying means for application to the other electrode of the control diode. The means deriving a voltage may comprise constant voltage dropping means, whereby the diode is cut off when the rectified voltage drops below a predetermined level Further, in accordance with this feature, the power supply system may comprise voltage regulating means connected to receive the rectified voltage or providing operating voltage for the sensing means.

In a still further feature in accordance with the invention, a power supply system is provided including an input circuit for receiving alternating input power, a power supply for converting power received by the input circuit to direct current, and a circuit for applying the output of the input circuit of the power supply. The applying circuit comprises a solid state relay having a circuit interconnecting the input circuit and power supply and a control device for controlling the interconnecting circuit. The system further comprises a control circuit for producing a first signal responsive to the amplitude of a voltage in the system, and means applying the first signal to one terminal of the control device for controlling the solid state relay.

In this arrangement, a regulating circuit may be provided for supplying operating power to the control circuit, as well as a rectifying circuit for rectifying the alternating power to produce a d.c. voltage supply or the regulating circuit, and a constant voltage dropping means for applying the d.c. voltage to the other terminal of the control device, whereby the control device is cutoff whenever the d.c. voltage is too low to enable proper operation of the regulating circuit.

In this power supply system the control circuit may comprise first and second transformers coupled to receive the alternating power, first and second rectifying circuits for rectifying the outputs of the first and second transformers respectively, sensing circuit means coupled to the first rectifying circuit for deriving the first signal, and means coupled to the second rectifying circuit for deriving operating voltage for the control circuit. The control circuit may further comprise means for generating control signals responsive to the alternating power being outside cf a determined range.

In addition, in this arrangement, the control circuit may comprise means for inhibiting the cutting off of the control device for a predetermined time following initial application of alternating input power to the power supply system, and the control circuit may further comprise on-off switch means connected to inhibit energization of the control device without inhibiting application of alternating power to the solid state relay.

In accordance with another feature of the invention, a microcomputer system is provided comprising a housing, a card cage, a power supply and a memory unit, and means for mounting the card cage and power supply laterally of one another and rearwardly of the memory unit in the housing. The card cage, power supply and memory unit have passageways enabling the flow of air therethrough in the front to back direction of the housing. The housing has front and rear apertures for the flow of air therethrough with the remainder of the walls thereof being substantially unapertured. A main fan means is provided in the housing for blowing air in the front to back direction therein, and a circulating fan may be provided for blowing air transversely in the housing.

In order that the invention may be more clearly understood, it will now be disclosed in greater detail with reference to the accompanying drawings, wherein.

Figure 1:
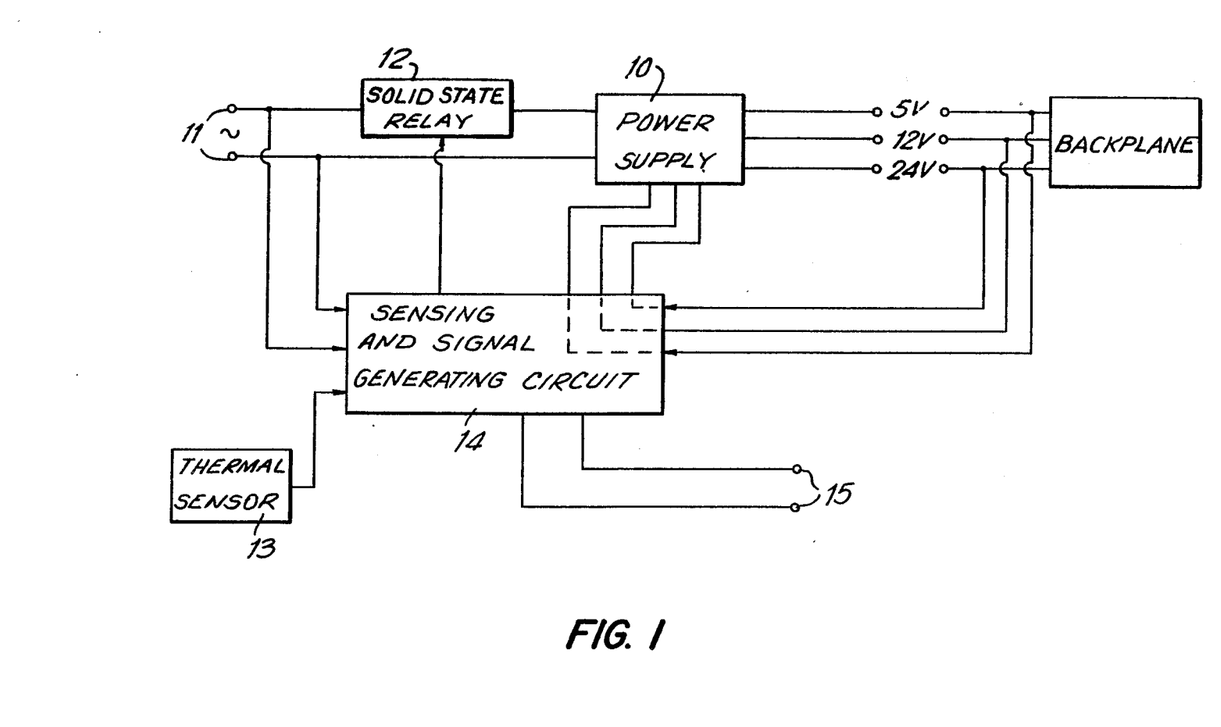
FIG. 1 is a block diagram of a power supply system in accordance with the invention.

Referring now to the drawings, and more in particular to FIG. 1, the power supply system in accordance with the invention may incorporate a conventional power supply 10 for converting a.c. input voltage to d.c. output voltage, for example 5 volts and 12 volts, for operation of a computer system. A.c. input power from input terminals 11 is applied to the power supply 10 via relay 12, preferably a solid state relay. Control voltages for operation of the relay 12 are derived from the a.c. input voltage and the d.c. output voltage(s), as well as from other environmental sensing devices such as a thermal sensor 13, in a sensing and signal generating circuit 14. Control signal voltages are also derived in the sensing and signal generating circuit for application to the control terminals 15, these control signal voltages being in accordance, for example, with the power down protocol of a computer using the power supply system as a power source.

As will be apparent, the use of a solid state relay (SSR) to control the application of alternating voltage to the power supply enables the limitation of the range of input voltages to which the power supply 10 is subject, as well as enabling the economical and rapid generation of control signals indicative of the necessity of invoking power down routines in the computer.

Figure 2:
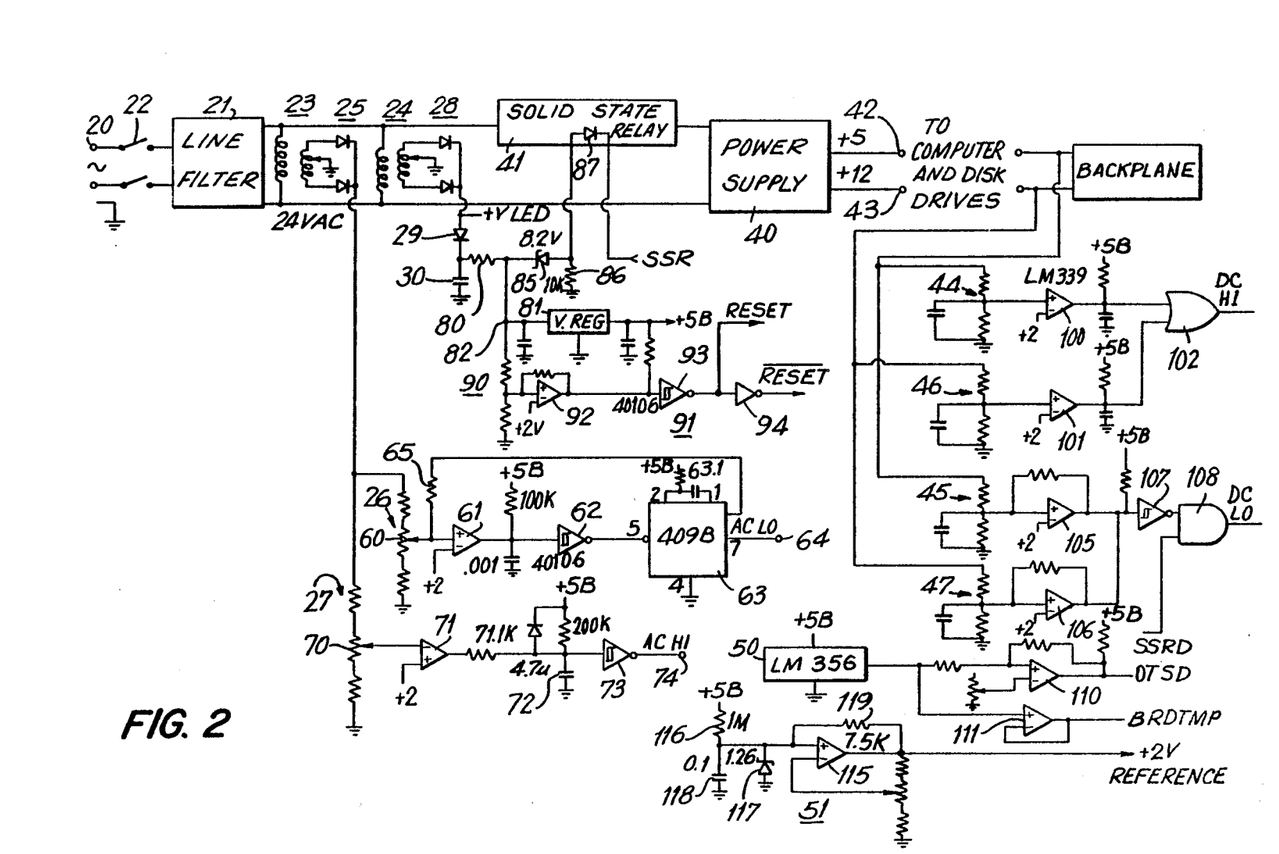
FIG. 2 is a circuit diagram of a portion of the system of FIG. 1.

Referring now to FIG. 2, the power supply system in accordance with the invention is connected to AC supply input terminals 20 by way of a conventional line filter 21, and power switch 22. The AC output of the filter 21 is applied to the primary windings of transformers 23 and 24, each of these transformers having a 24 volt secondary winding.

The secondary winding of the transformer 23 is connected by a full wave rectifier circuit 25 to voltage dividers 26 and 27 in parallel. The secondary winding of the transformer 24 is connected by way of a full wave rectifier circuit 28 and series rectifier 29 to a storage capacitor 30.

Series rectifier 29 prevents storage capacitor 30 from discharging into the LED indicators in the event of a power failure. This is necessary to keep the circuitry operating long enough for it to go through the power-down protocol.

The two transformers 23 and 24 are employed in order to avoid effects from loading. Thus, the transformer 23 is employed solely for sensing the ac high and low levels. Since power for the internal logic of the power supply is derived from the transformer 24, variable loading on this transformer could effect the ac sensing levels if only a single transformer were employed. The transformer 23, on the other hand, always has a constant load.

The AC output of the line filter 21 is also applied to a power supply circuit 40, with a solid state relay 21 being connected in series with one of the leads to the power supply 40. As an example only, the power supply 40 may be of a commercially available type, such as type GX 500-5001F of the Summit corporation. The power supply 40 has a 5 volt output applied to terminal 42, and a 12 volt output applied to terminal 43, for supplying operating power to computer, disc drives, etc. The 5 volt output of the power supply is also sensed at the backplane and applied to voltage dividers 44 and 45, and the 12 volt output of the power supply 40 is also applied to voltage dividers 46 and 47.

There are 2 5-volt power supplies on the board. One is the main 5 volt supply (72 amp) that runs the computer; the other is a 100 ma supply that runs the critical circuits on the board.

The circuit illustrated in FIG. 2 further includes sensing circuits that provide logic and other signals for operation of the system in accordance with the invention. Thus, the voltage divider 26 includes a potentiometer having its arm 60 connected to the non-inverting input of comparator 61, the inverting input thereof being connected to a positive 2 volt reference. The output of this operational amplifier is connected by way of Schmitt trigger 62 to the negating trigger terminal of a monostable multivibrator 63. The inverted output of the multivibrator is applied to an ACLO output terminal 64 and the non-inverting output is fed back by way of a resistor 65 to the non-inverting input of the amplifier 61. This circuit senses the peaks of the full wave rectified output of the transformer 23, to provide an ACLO output that is normally low, and goes high when the peaks of the AC input voltage fall below a level that is determined by the potentiometer arm 60 for a time determined by the time constant of the monostable multivibrator 63. The feedback from the monostable multivibrator to the input of the comparator 61 is necessary to eliminate oscillation in the system. Thus, when the system is shut down as a result of sensing of a low AC voltage, the current drain on the AC line decreases, and the voltage may thereby increase, for example, about three volts. This voltage increase at the input may otherwise effect the turning on the power supply again, to again result in a low power condition. The feedback circuit prevents the possible oscillation that results from such conditions.

The multivibrator 63 is triggered at every peak of the rectified dc input signal applied to the comparator 61, to feedback a high signal input to the comparator if the peak has been sufficiently high. The time constant of the circuit, of about 2 half cycles of the ac input, consequently does not result in a continuous ac low signal unless about two succeeding half cycles the input voltage are below the threshold level, resulting in the absence the feedback from the multivibrator. The circuit thus not only enables the sensing of the condition of low ac voltage, but also enables control over the required number of cycles that the ac signal is low in order to signal the necessity of a shutdown of the equipment due to low ac input voltage. For example, the time constant of this circuit may be adjusted, by the potentiometer 63.1, in dependence upon the load upon the system, since it may be desirable to hold off a shutdown of a lightly loaded system for a longer period than a heavily loaded system.

The arm of the potentiometer 70 of voltage divider 27 is applied to the inverting input of comparator 71, the noninverting input thereof being connected to the 2 volt reference. The output of the comparator 71, which goes low when the AC input exceeds a given level, is applied to a discharge capacitor 72 and thence to the Schmitt trigger 73. The output ACHI of the trigger, which is applied to the terminal 74, is normally low, and goes high when the AC input voltage is too high for operation of the system. Capacitor 72 and a 71.1 K resistor insure that short duration excursions of the AC line will not cause the ACHI signal to go active.

The voltage across the storage capacitor 30, which is unregulated, is applied by way of current sensing resistor 80 to the input of 5 volt regulator terminal regulator 81, to provide 5 volts of operating voltage for the logic circuits of the power supply control circuit. It will be noted that the input voltage, at input terminal 82 of the voltage regulator must be at least 8.0 volts in order to maintain a regulated 5 volt output from the regulator 81.

The terminal 82 is also connected to a voltage divider comprised of an 8.2 volt Zener diode 85 and resistor 86, the voltage across the resistor 86 being connected to the anode of the operating diode 87 of the solid state relay 41, the diode 87 comprising an LED in the relay positioned to control the current through the solid state relay in conventional manner. The cathode of the diode 87 is effectively connected to ground by way of a field effect transistor, as will be discussed The voltage across the resistor 86 must be at least one volt, in order to turn on the solid state relay. It is thus apparent that the voltage at the terminal 82 must be at least 9.2 volts in order for the solid state relay 41 to apply input power to the power supply. Thus, the SSR 41 ensures that no power is applied to the power supply 40 unless the input voltage to the regulator 81 is adequate to ensure adequate operating voltage to the sensing and logic circuits to ensure proper operation thereof.

The voltage at terminal 82 is also applied to a voltage divider 90 connected to a reset generator 91. The reset generator includes a comparator 92 having its noninverting input connected to the voltage divider 90 and its inverting input connected to the two volt reference. The output of the comparator 92 is applied to a Schmitt trigger 93 for producing a reset voltage, the reset voltage being applied to an inverter 94 to produce the negated reset signal. When the voltage at terminal 82 falls below about 8 volts, the reset signal goes low. Due to hysteresis, it does not return to its high state, however, until the voltage at the terminal 82 goes above 10 volts. By holding off the rise of the reset voltage until the voltage at the terminal 82 rises to 10 volts, it is ensured that a reset is sustained until there is an adequate drop across the regulator 81 to ensure a regulated 5 volt output from the regulator 81.

The voltage dividers 44 and 46, connected to the 5 and 12 volt outputs respectively, are applied by way of comparators 100, 101 to separate non-inverting inputs of OR gate 102, so that the output of the OR gate 102 remains low as long as the 5 and 2 volt outputs of the power supply 40 are not higher than permissable for operation of the computer and disc drives.

The outputs of the voltage dividers 45 and 47 are applied to the non-inverting inputs of comparators 105 and 106, and thence to the input of inverting Schmitt trigger 107, to provide an output that remains low as long as the 5 and 12 volt outputs of the power supply 40 do not drop below determined voltages. This output voltage is applied to one input of AND gate 108, the other input of this AND gate being derived from the signal SSRD to turn on the solid state relay 87 to produce the DCLO signal.

The comparators discussed may all be of type LM339, the 2 volt reference also being applied to the other input terminals of the comparators 100, 101, 105 and 106.

The output of the temperature sensor 50 is applied to comparator 110 to produce an output signal OTSD that remains low unless the temperature within the system exceeds determined limits. The thermal sensor 50 may hence be located at any sensitive location, for the detection of heat in the assembly. In addition, the output of the sensor 50 is applied to an operational amplifier 111 connected as a voltage follower to provide the temperature sensitive output signal BRDTMP.

The voltage reference circuit 51 includes an operational amplifier 115 whose noninverting input is connected to the 5 volt output of regulator 81 by way of a large resistor 116, this input being shunted by a 1.2 volt Zener diode 117 and capacitor 118. The output of the amplifier is fed back by way of resistor 119, and the inverting input of the amplifier is connected to an arm of a potentiometer coupled to the output of the amplifier. The amplifier is set to have a gain of about 1.5, so that the output thereof is 1.5 times the voltage across the diode 117, i.e., about 2 volts. This circuit thereby enables the development of a desired reference voltage without the necessity or precise selection of a reference diode having the desired voltage.

Figure 3:
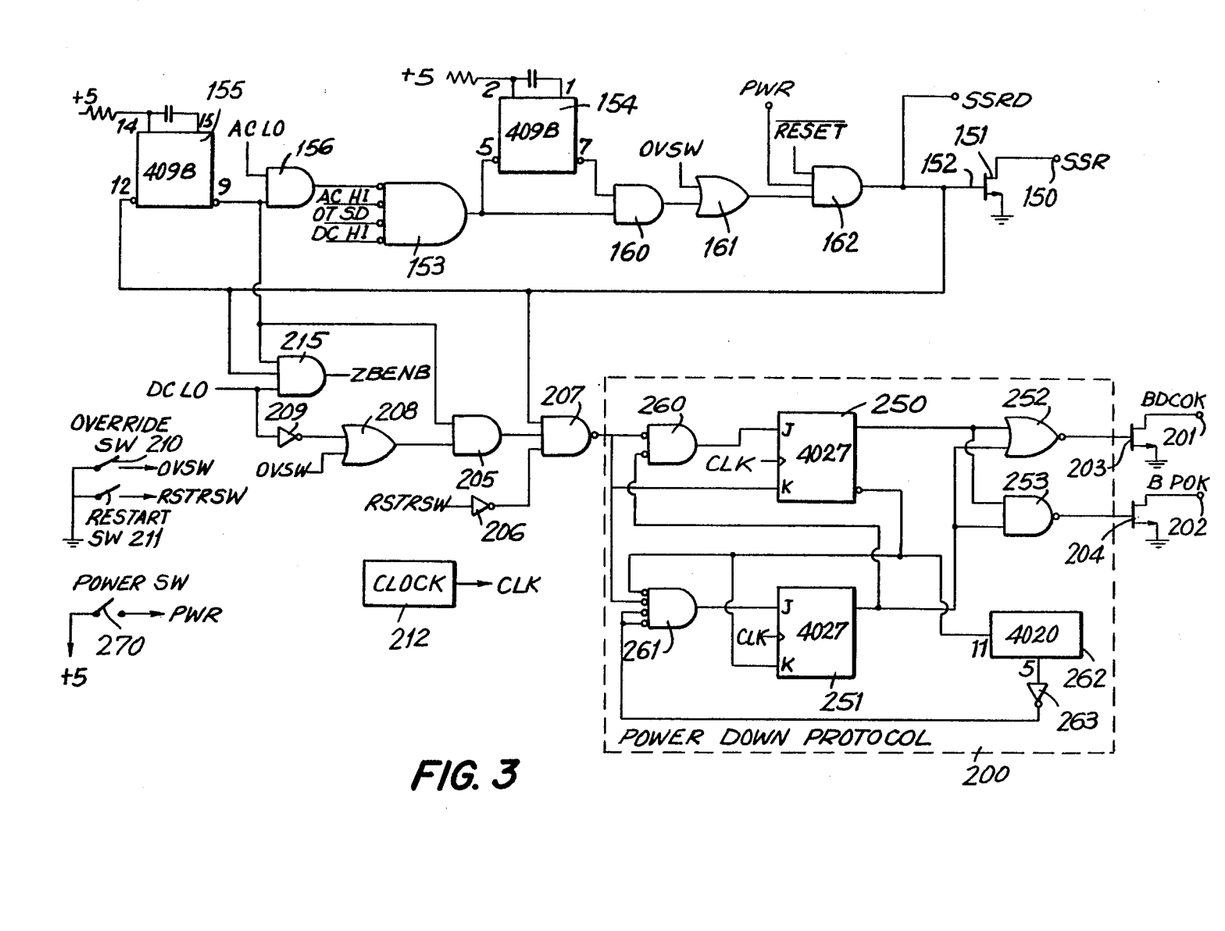
FIG. 3 is a circuit diagram of a further portion of the system of FIG. 1.

The logic circuit for control of the solid state relay, as well as for establishing the power down protocol, is illustrated in FIG. 3. In this circuit, the terminal 150 is connected to the cathode of the LED of the solid state relay as above discussed, this terminal being effectively grounded in normal operation by the FET 151 having a high logic level at its gate 152. In this case, the 4 inputs to the NAND gate 153 are low, the output of the monostable multivibrator 154 is high, and the PWR and negated reset signals are also high. In addition, the output of a monostable multivibrator 155 is normally high, so that this output and the normally low ACLO signal, applied to the AND gate 156, holds the corresponding input to the NAND gate 153 low.

In the event that any of the signals ACLO, ACHI, OTSD or DCHI go high, as a result of undesirable voltage or temperature conditions, the output of the NAND gate 153 goes low, thereby causing the output of the succeeding AND gate 160 to go low, the output of the succeeding OR gate 161 to go low, and the output of the succeeding AND gate 162 to go low. Since the output of the AND gate 162 is connected to the gate of the FET 151, current for the LED of the solid state switch is interrupted, whereby power to the power supply 40 is interrupted, and the 5 and 12 volt outputs thereof to the computer and disc drives are cut off.

The monostable multivibrator 154 is triggered by the low going output of the NAND gate 153, to drop its output applied to the AND gate 160. The multivibrator 154 has a time constant of about 1 second so that the low output thereof ensures that the solid state relay remains cut off for at least 1 second, each time that the circuit described has been cut off by either of the above four signals.

In addition, the output of the AND gate 162 is applied as an input to monostable multivibrator 155, thereby driving the inverting output of this multivibrator low, which blocks the holding of the solid state relay in nonconductive condition when the ACLO signal is high. This multivibrator, which has a time constant of about 0.1 seconds, prevents the circuit from responding to an ACLO signal upon the initial turning on of the system. It as been found that, without use of this circuit, the power to the power supply 40 may be repeatedly unnecessarily turned on and off.

When the circuit is running on a generator, and the power is initially turned on, about two peaks of the sine wave of the generator output may be clipped, as a result of the inrush of current. Thus may result in an indication of low ac power, to effect the shutting down of the system. Upon such shutting down, the power input again rises, to effect a detection of adequate ac input. The consequent drain on the power results in again clipping the input wave to sense a low ac input condition. The system consequently oscillates on and off. By employing the multivibrator 155, however, the input power is not sensed for the initial 100 milliseconds, so that the initial dip in ac power, upon turning on of the machine, is ignored.

While the DCLO signal may be also coupled to control the solid state relay in the above matter, in the preferred embodiment of the invention this signal is employed only in the control of a power down logic protocol circuit 200. This protocol circuit 200 is specifically designed to provide the necessary output signals BDCOK and BPOK, at terminals 201 and 202 for DEC computing systems. The control logic of the protocol circuit 200 controls ET's 203, 204 for the production of the output signals.

As illustrated in FIG. 3, the output of an AND gate 205 and the output of an inverter 206 are applied to a NAND gate 207, as an input signal for the protocol circuit 200. One input of the AND gate 205 is derived from the output of the multivibrator 155, the other being derived from an OR gate 208. One input of the OR gate 208 is derived from the DCLO signal by way of an inverter 209, and the other input is derived from override switch 210. The input of the inverter 206 is derived from a restart switch 211. A clock circuit 212 is provided for control of the internal flip-flops of the protocol circuit 200.

A further control signal is derived from the output of AND gate 215, whose inputs are derived from the output of the multivibrator 155, the output of the AND gate 162 and DCLO signal.

The power down protocol circuit 200 is comprised of 2 JK flip-flops 250, 251, whose noninverted outputs are applied to NOR gate 252 for control of the FET 203, and to NAND gate 253 for control of FET 204. The J input of the flip-flop 250 is derived from a 2 input NAND gate 260, whose inputs are derived respectively from an output of the NAND gate 207 and the output of the flip-flop 251. The K input of the flip-flop 250 is derived from the output of the NAND gate 207.

The J input of the flip-flop 251 is derived from the output of a NAND gate 261 whose inputs are derived from the inverted output of the flip-flop 50, the output of the NAND gate 207, and the outputs of a counter 262 as inverted by an inverter 263. The inputs of the counter 262 is derived from the inverted outputs of the flip-flop 250. The K input of the flip-flop 251 is derived from the inverted output of the flip-flop 250.

The OR gate 161 has a further input derived from the override switch 10, and the AND gate 162 has, as further inputs, the inverted reset signal discussed above, as well as a PWR signal responsive to operation power switch 70.

In accordance with the power down protocol represented by the illustrated system, the control signal BDCOK is employed to indicate that the DC power is satisfactory, and the BPOK is employed to indicate that the power signal is satisfactory. The BPOK signal is used to generate an interrupt to the processor, or advise the system that the power is going down in about 4 milliseconds. When the BDCOK signal goes low, it is conventionally used to shut off all processing in the computer. The BDCOK signal has to go low and stay low for as long as it takes for the five volt power supply for the computer to decay in the back plane of the computer. Conversely, when the power comes back up, it is necessary to hold the BDCOK signal low until conditions are stable, before it is permitted to go high. Otherwise, conditions in non-volatile memory in the computer may be adversely affected. The capacitor 30 is provided with sufficient capacity (for example, employing to 470 microfarad capacitors) that the voltage on these capacitors is held above 8.0 volts sufficiently long that the dc power on the back plane of a computer at terminal 42, 43 decays before the voltage at terminal 82 drops below 8.0 volts. Thus, it is desirable to employ low power circuits, such as CMOS circuits, for the logic circuitry of the system of the invention. The whole logic circuit may draw, for example, 15 milliamperes.

The use of a solid state relay 41 in series with the power supply 40 serves a number of functions. With the system in accordance with the invention, it is not necessary to provide an expensive power supply 40 that is capable of withstanding an extreme range of input voltages. The power supply can be selected in accordance with the range of voltages for which the power supply should be operative, with the ac sensing circuits controlling the solid state relay to block voltages out of the rated range of the power supply. The power supply system in accordance with the invention hence can be more economical than known devices.

In addition, in accordance with the invention, it is not necessary to provide the power supply switch 22 as a front panel control. The front panel power switch may merely comprise the low power switch 270 for controlling the input to the AND gate 162. This serves a number of advantages. For example, employing a low power logic level switch as a power control on the front panel, instead of switching the ac voltage, the arrangement in accordance with the invention is safe for use in adverse environmental conditions, such as in the presence of explosive gases or the like.

Figure 4:
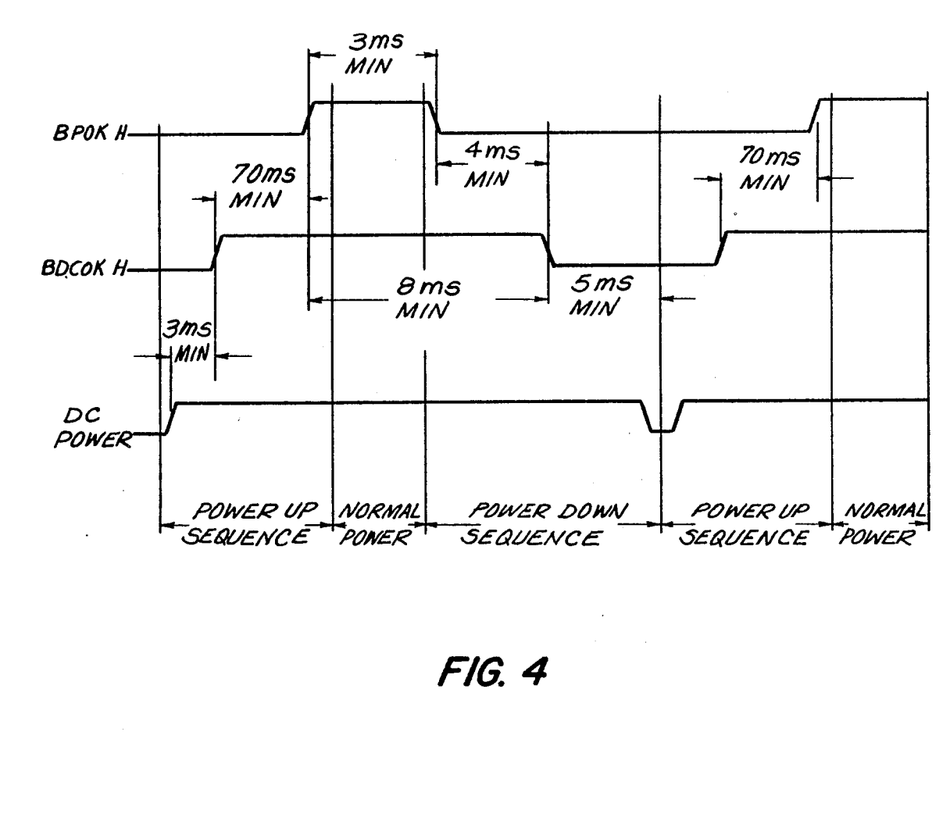
FIG. 4 is a timing diagram of some control signals that may be output in the system of FIG. 3.

In the past, complicated circuitry has been required for generating signals according to the protocol of the BPOK and BDCOK signals, as illustrated in FIG. 4. The arrangement of the present invention enables the generation of these control signals in a simple, accurate and economical manner, while maintaining full control over the operation of the power supply itself. The circuit of the invention does not require the provision of crowbar protection circuits.

The protocol circuit 200 operates in accordance with conventional logic, responsive to the input signal, to produce signals as illustrated in FIG. 4.

The window circuit including the comparators 100, 101, 105, 106, comprises a window comparator circuit that will result in the generation of a power fail signal whenever either the five or twelve volt computer supply voltages are either too high or too low. The sensing of the ac levels, independently of any loads, is necessary since the change in ac voltage level may occur prior to any change in the dc output voltage of the power supply.

Accordingly, it is necessary to advise the computer of a pending power failure, so that necessary steps can be taken, for example, to finish a given procedure or store critical data in non-volatile memory.

The above-described circuit of the invention enables the logic to function to a low enough level such that it is insured that control is maintained over the solid-state relay, even though the voltage is excessively low. In accordance with the invention, low voltage devices such as CMOS logic circuits are employed, which are capable of functioning to voltages as low as 3 volts. By the time the output of the voltage regulator 81 has reached such low (unregulated) voltage, however, the solid state relay of the invention will have already been turned off, since at least one volt is required across the resistor 86 in order to operate the solid state relay. The Zener voltage of diode 85, however, will have reduced the voltage across the resistor 86 for all voltages at the junction 82 below 9.2 volts. Accordingly, the solid state relay is positively turned off for all conditions of input voltage that are adequate to supply necessary operating voltage for the logic circuits.

The power supply has a stirring fan that runs all of the time, to circulate the air. A thermal sensor is also provided, which switches a main fan on and off. The temperature within the computer enclosure is sensed by another thermal sensor on the power control board. If the enclosure is too cold, this thermal sensor will hold the BDCOK line low so that the microcomputer cannot operate until it reaches the appropriate temperature. Thus the enclosure is allowed to self heat from the power dissipated by the microcomputer, but the microcomputer is not allowed to run until it has reached a temperature where it is guaranteed to operate without error. The stirring fan circulates the air transversely within the case, whereas the main fan blows the air in the front-to-back direction, where air vents are applied.

The ac sensing circuit may be set, as an example, to sense voltages in the range of 95 to 135 volts.

Figure 5:
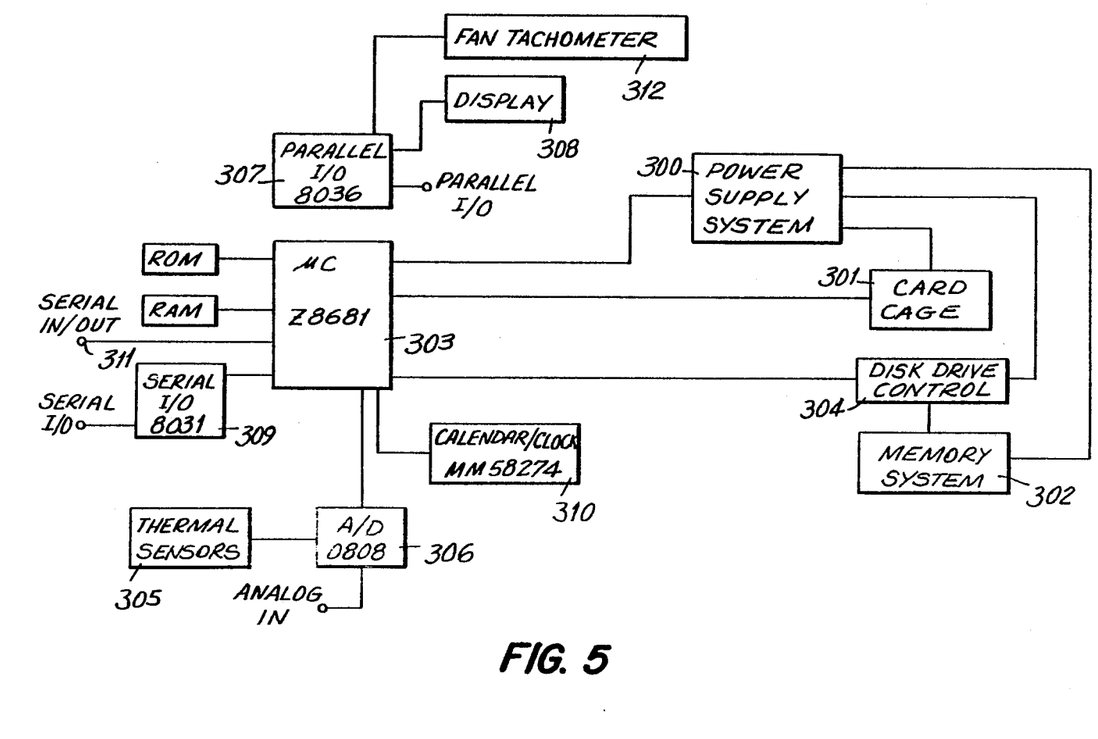
FIG. 5 is a simplified block diagram of a more complete system in accordance with the invention.

FIG. 5 is a simplified block diagram of a more complete system in accordance with the invention, incorporating the power supply system 300 as disclosed above with reference to FIGS. 1-4. Power from this supply is applied to the backplane of the card cage 301, as well as to the memory system 302 and microcomputer 303, for example of type Z8681. The card cage is adapted to hold microcomputer and peripheral cards of conventional design. The memory system 302, as will be discussed in the following paragraphs, may include disk and/or tape drives, for use with the microcomputer installed in the card cage. In order to avoid operation of the drives of the memory system under too cold environmental conditions, the application of drive power to the memory system may be effected by way of a drive circuit 304, under the control of the microcomputer 303. The system may thus include various thermal sensors 305, coupled to the microcomputer 303 via an A/D circuit 306, to monitor ambient temperature for the control, for example, of the control circuit 304.

The microcomputer 303 may be provided with a parallel I/O interface 307, for example for control of the system display panel 308 and a serial I/O interface 309, as well as a calendar/clock circuit 310, and may also be connected to the backplane to sense determined conditions in the microcomputer card cage. Programs may be directly written into the memory of the microcomputer 303 via the serial I/O terminal 311, so that an operator may control, for example, the information that is displayed on the display panel. In addition, cooling fans in the system may be provided with tachometers 312, that the microcomputer can sense the operative conditions of the fans, so as to provide, for example, an indication or alarm of inoperative fans.

The microcomputer 303 is thus employed primarily for display control and condition sensing. The failure of this microcomputer system will not interfere with the operation of the microcomputer in the card cage, as long as the power supply system 300 remains operative.

Figure 6:
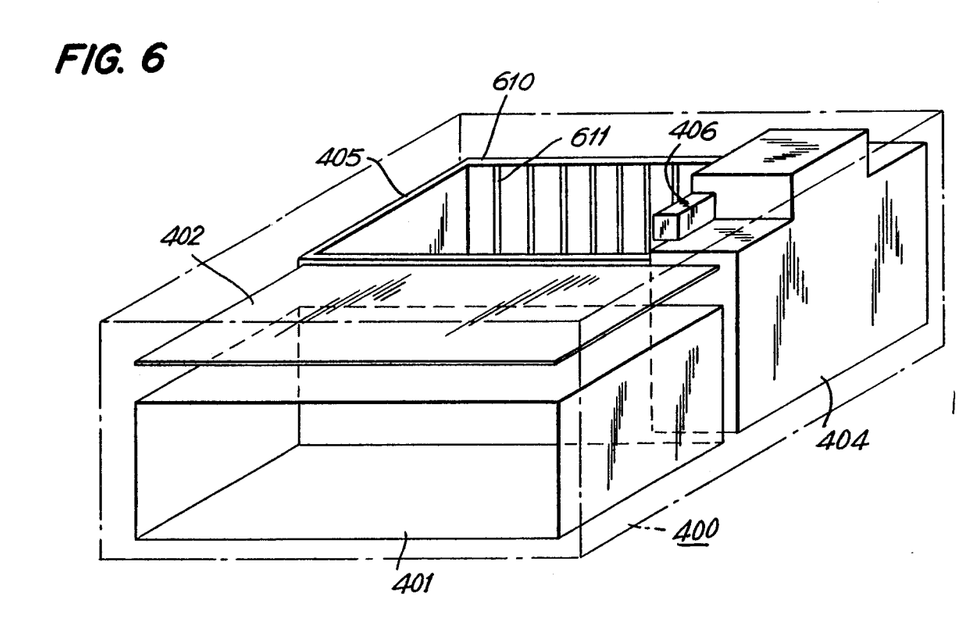
FIG. 6 is a perspective phantom view of the preferred assemblage of a power supply in accordance with the invention.

Referring now to FIG. 6, therein is illustrated, in simplified form, a preferred assemblage of power supply components in accordance with the invention. In this figure, a housing illustrated in dash-dot lines surrounds the assembly of components, the housing having top, bottom, and side walls that are substantially solid, i.e., do not have substantial apertures for the passage of air. A front cover (not shown in FIG. 6) permits the passage of air therethrough, and, as will be described, air may also pass through the rear of the housing.

A memory receptacle 401 is shock mounted in the front of the cabinet, the receptacle 401 having bottom, top, and side walls, but no substantial front or rear surfaces, so that cooling air may pass therethrough. The receptacle 401 substantially fills the width of the housing. A circuit board 402 is mounted in the housing above the receptacle 401, the circuit board incorporating the circuits of FIGS. 1-5 as above discussed. A panel incorporating display devices and switches of the circuitry may be affixed to the front cover (not shown in FIG. 6). A power supply 404 is mounted in the housing to the rear of the receptacle 401, and a card cage 405 is mounted to the rear of the receptacle 401, laterally of the power supply 404. A fan 406 may be positioned within the housing, at any convenient location, to circulate air in a direction transversely of the front-to-back direction of the housing, the fan 406 preferably being continually on (i.e., not being controlled by a thermostat), to enable, for example, the entire unit to be heated to a desired temperature from a cold start. As will be seen, further fans are provided for cooling, preferably mounted in the rear of the housing, for directing air through the front and rear apertures of the housing.

Figure 7:
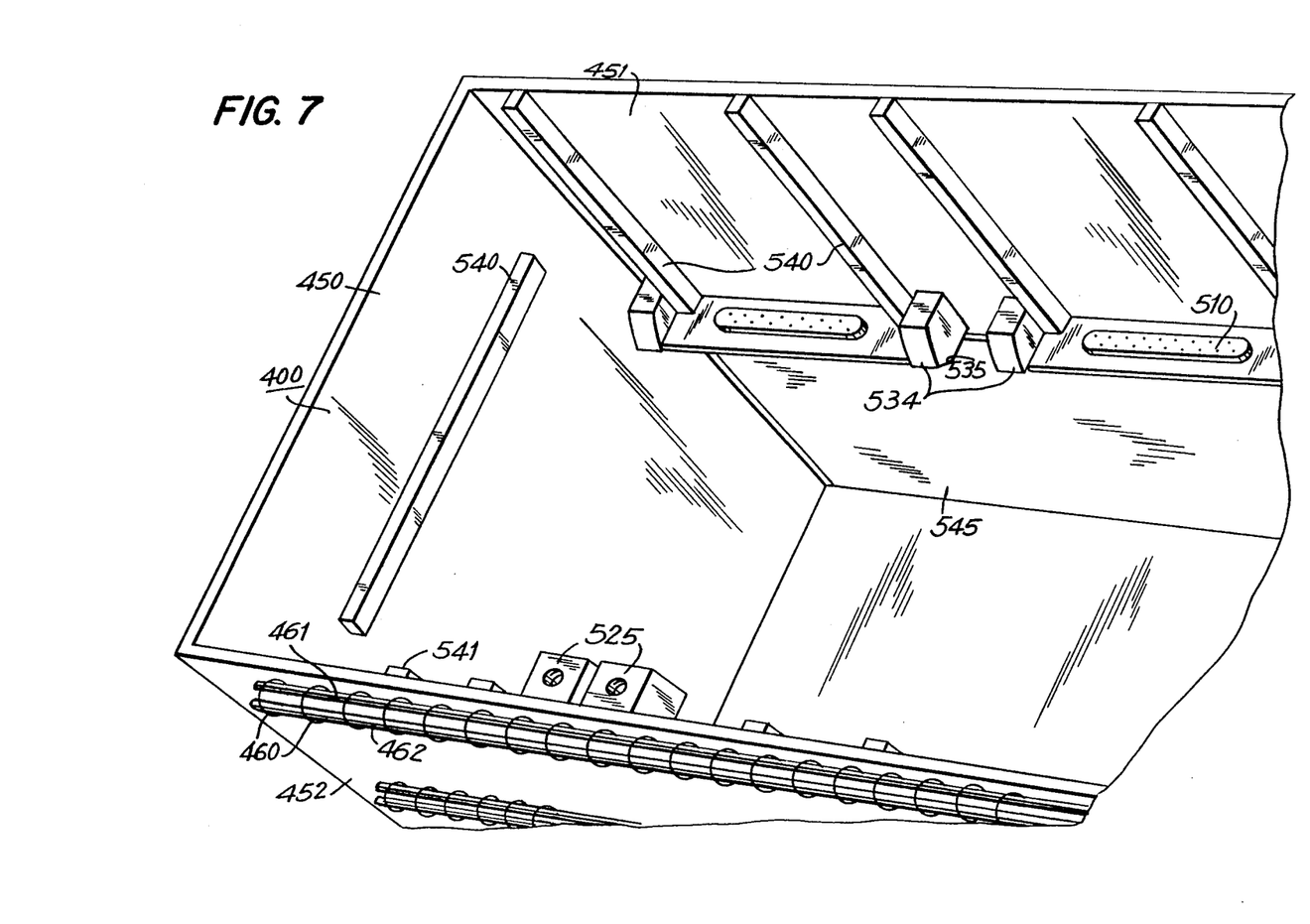
FIG. 7 is a perspective view of a portion of the memory receptacle for the assemblage of FIG. 6.
Figure 8:
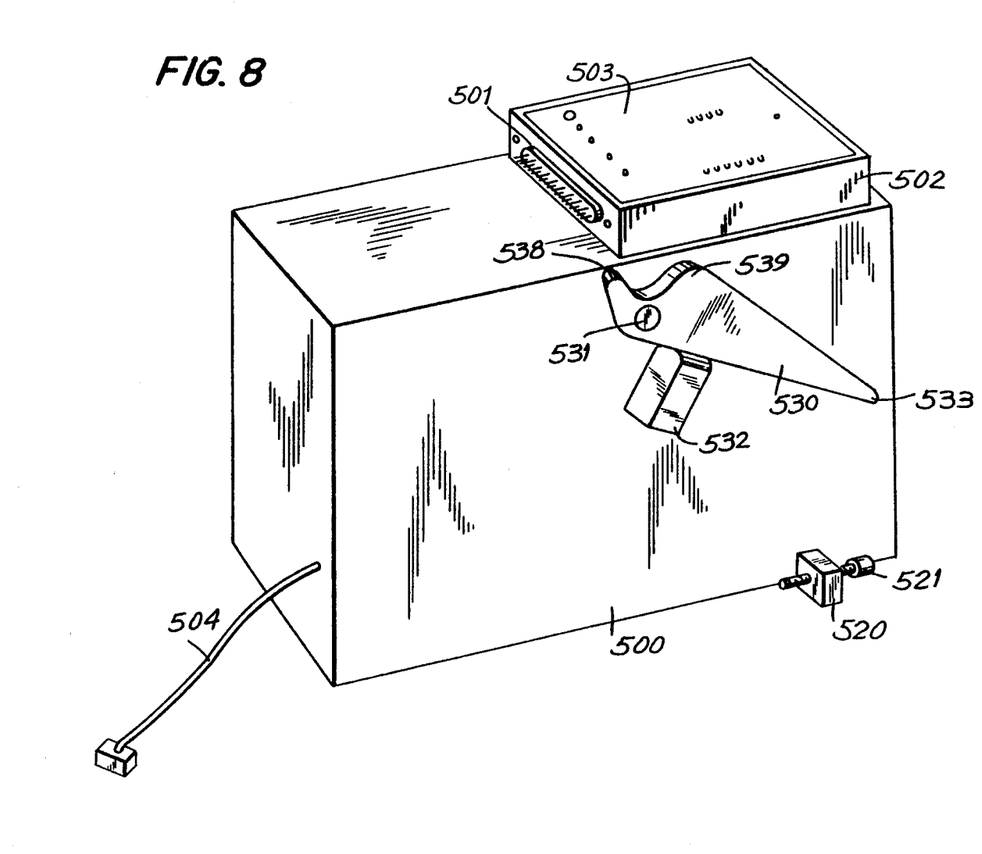
FIG. 8 is a perspective view of a memory canister that may be mounted in the memory receptacle of FIG. 7.

The memory receptacle 401 is more clearly illustrated in the perspective cutaway view of FIG. 7, and a memory canister adapted to be received therein is illustrated in the perspective view of FIG. 8. FIG. 7 shows the left side wall 450, the top wall 451, and the bottom wall 452 of the receptacle. The receptacle is adapted to receive and provide electrical connections for a plurality of memory canisters, of the type for example illustrated in FIG. 8. In order to enable a clearer understanding of the hardware employed in the receptacle, a description will first be given of the canister 500 of FIG. 8. The canister 500 is adapted to receive a conventional memory device, such as a hard disk, floppy disk, or tape, the memory device being accessible through the front of the canister 500 (not shown). Internal connections are made between the memory device and a connector 501 facing the rear of the canister and mounted in a connector housing 502 projecting from the top of the canister 500. The connector housing 502 may incorporate a circuit board 503 for simplifying the connections of the memory device to the canister connector 501. Depending upon the type of memory device inserted in the canister, all of the connections to the memory device may be accessed by way of the connector 501 (for example in the case of a hard disk), or an additional lead-in connector 504 may be provided as desired, for some of the connections to a floppy disk. The connector housing 502 is provided so that the connector 501 engages the mating connector 510 of the receptacle (referring to FIG. 7), merely by pushing the canister 500 horizontally into the receptacle 400.

In order to enable the firm holding of the memory canister in the memory receptacle, a block 520 is mounted to the side wall of the canister, preferably adjacent the front thereof, the block 520 carrying a mounting screw 521. When the canister is assembled in the receptacle of FIG. 7, the rear of the block 520 engages the front of a cooperating block 525 mounted to the bottom wall of the receptacle, the block 525 having a threaded hole for receiving screw 521.

In order to simplify the insertion of the canister in the receptacle and its removal therefrom, each canister has a lever 530 pivotally mounted to its side wall for rotation about a pivot axis 531 extending perpendicular to the side wall thereof. The lever 530 preferably extends forwardly of the pivot axis 531, to have a lower position, as illustrated, resting on a stop 532 in the disassembled state, with the lever extending generally downwardly and forwardly at an acute angle as illustrated, with the front end 533 of the lever being accessible for manipulation by the finger of an operator from the front of the canister. A mating block 534 is mounted in the top wall 451, as illustrated in FIG. 7, laterally of the connector 510. The inner end of the lever has a rear upwardly extending projection 538 and a forward upwardly extending projection 539 positioned to engage the rear side and front side, respectively of the block 534, at different positions of the lever. Thus, when the canister is initiallyinserted in the receptacle, with the lever held in an upper position, until the connectors 501, 510 engage, depression of the lever causes the projection 538 to engage the rear of the block 534 so that further forcing of the lever downwardly enables forcing of the connectors together. The blocks 534 may have curved rear surfaces 535 to facilitate this action. When the canister is fully installed, the lever 530 will thus be in a lower position. At this time, forcing the lever upwardly causes the projection 539 to engage the front of the block, thereby forcing the connectors apart and enabling release of the canister from the receptacle.

The inside of the receptacle 400 is further provided with suitable guides 540 and slides 541 for accurately guiding the connectors of the canisters to the corresponding connectors 510 of the receptacle.

As further illustrated in FIG. 7, a circuit board 545 may be mounted on the rear upper wall of the receptacle, to enable interconnection of the connectors 510, and any other desired connectors in the receptacle, to the further components of the power supply system of the invention.

The receptacle, as discussed above, is adapted to be shock mounted in the housing of the power supply system. For this purpose, any conventional shock mounting arrangements may be adapted, for example mounting the bottom 452 of the receptacle to the bottom of the housing. In the illustrated shock mounting arrangement, the shock mounts are in the form of resilient wire loops 460 extending between bars 461 mounted to the underside of the receptacle, and bars 462 mounted to the bottom of the housing, at the front and rear edges of the receptacle.

Figure 9:
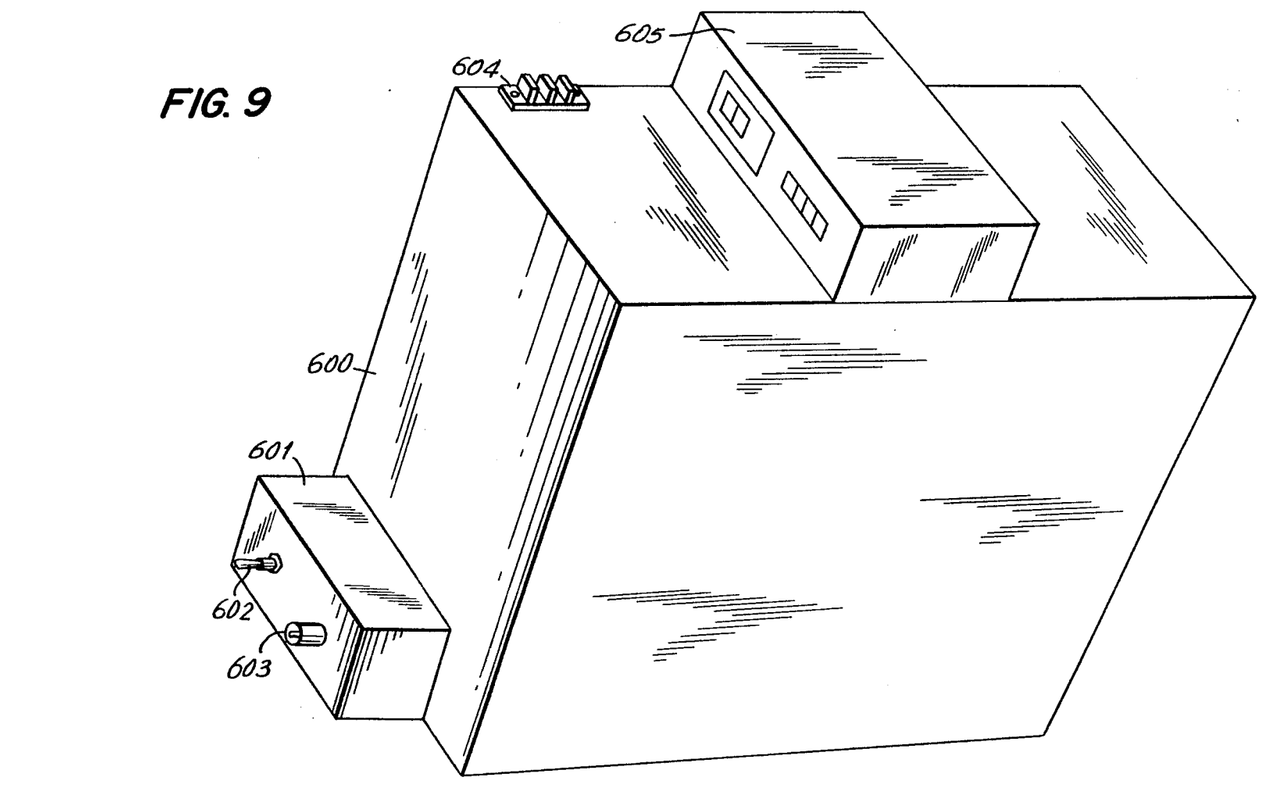
FIG. 9 is a perspective view of a power supply that may be employed in the assemblage of FIG. 6.

FIG. 9 is a perspective view of a power supply that may be employed in the power supply system in accordance with the invention. The power supply electrical components are conventional, and mounted in a housing 600. A switch in the connector housing 601 projects from the rear bottom of the housing 600, and has a rearwardly extending power switch 602 and power connector 603. The power switch 602 is connected to switch on and off the entire power to the power supply system, i.e., the switch 22 of FIG. 2, and is not generally controlled in the operation of the system. The provision of the switch on the power supply housing simplifies the assembly of the power supply system.

Connections to the power supply of FIG. 9, to the other components of the power supply system, may be made by way of a terminal block 604 mounted on the top of the housing 600, and by way of suitable leads (not shown) extending into a connection housing 605 extending upwardly from the top of the power supply.

The card cage 405 illustrated in FIG. 6 is of conventional construction, having a frame 610 holding card guides 611, for guiding circuit cards downwardly to suitable connectors (not shown) on a terminal board (not shown) mounted at the bottom of the card. The terminal board of the card cage is connected to receive power from the above discussed power supply.

The front panel display assembly is bolted to the front cover and connects to the Power Control Board by two ribbon cables. The display assembly does not attach directly to the Power Control Board.

Figure 10:
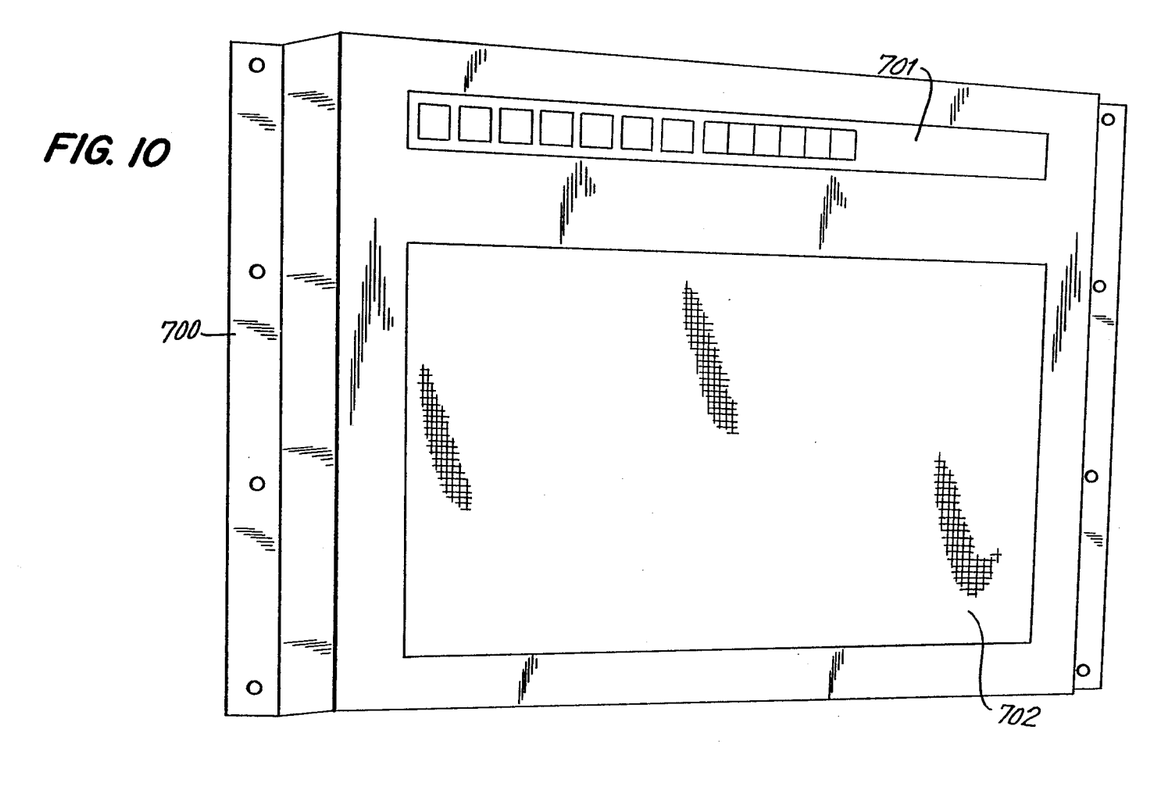
FIG. 10 is a perspective view of a front cover adapted to be fitted on the power supply assemblage of FIG. 6.

FIG. 10 is a view of a front cover that may be fitted to the power supply assemblage of FIG. 6. The cover 700 is adapted to be bolted to the front of the housing 400, and contains a switch panel assembly 701 that has indicators and controlling switches. A central aperture of the front cover 700, in alignment with the receptacle 401, permits the passage of cooling air therethrough.

Figure 11:
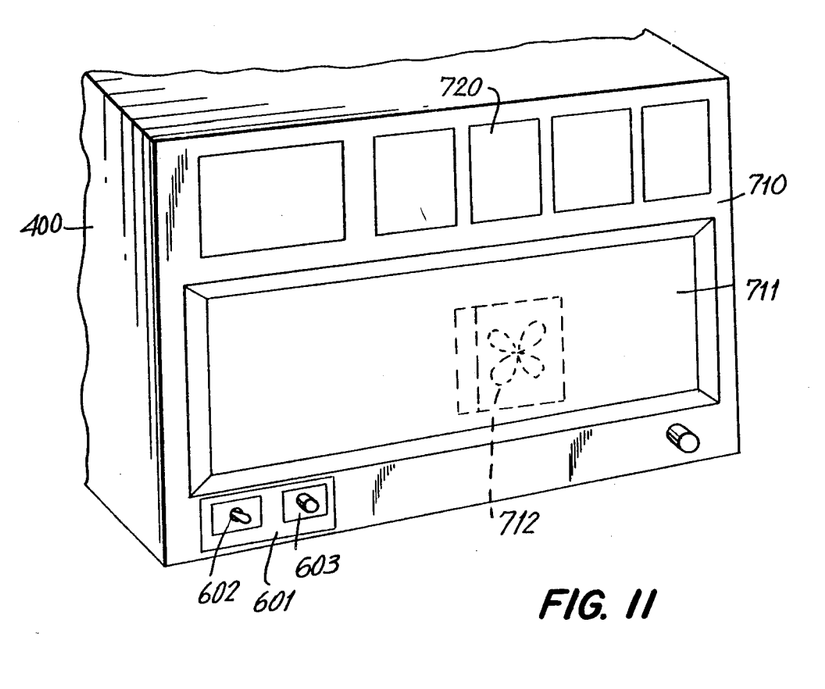
FIG. 11 is a perspective view of the rear of the assemblage of FIG. 6.

The rear wall 710 of the housing 400 is illustrated in FIG. 11, wherein it is seen that the switch housing 601 of the power supply extends through the rear wall to permit access to the switch 602 and connector 603. The rear wall is also apertured to provide mounting of a central air-permeable filter 711, and a cooling fan 712 at a suitable position behind the filter 711, to circulate air in the front-to-back direction, or vice versa, of the power supply system. Suitable further apertures may be provided, such as one or more apertures 720 for electrical connectors, for example, to desired I/O devices.

Any other desired connectors may also be provided on the rear panel, and interconnected to the system of the invention in conventional manner.

The temperature control system is incorporated on the disk distribution board 545. Each disk canister has a temperature sensor and a rocker switch with an LED indicator The LED indicator shows whether the rocker switch is on. If the switch is turned off, +5 V and +12 V is removed from the drive and the LED goes off and the canister may be removed. The logic is arranged in such a way that a non-present canister appears the same as one in which the switch is off. Power to the canister is switched by 2 MOSFETs. The gate of the MOSFETs has a long time constant so that when power is switched, it is switched slowly to avoid cutting transients on the power buses.

The operation of the temperature control system, first, is explained for a cold environment. If the temperature is below 0 deg C., +12 V is not applied to the disk drive so the drive would not attempt to spin-up. This is necessary because the drive may be damaged since the heads tend to stick to the disk surface at low temperatures. The computer plugged in the back plane is also held in a RESTART condition by the Power Control Module, but this is independent of the temperature control system. +5 V is applied to the drives so they can self-heat. The main fans are turned off, but the stirring fan is always on. In addition heater boards may be installed in the card cage to help raise the temperature if there are not enough other boards already installed to do the job. If these heater boards are present, they are turned on. When the temperature rises to 10 deg C., the computer such as a uVAX is allowed to run, and +12 V is applied to the drives so that they spin-up and the heater boards are turned off. When the temperature reaches 15 deg C. the main fans are turned on low. If the temperature drops at this point, the fans will shut off when the temperature falls to 5 deg C., and turn back on when the temperature reaches 15 deg C. Nothing else happens until the temperature rises to 40 deg which causes the fans to turn on high speed. This minimizes the audible noise from the fans.

The circuitry is implemented by comparators feeding into an EPLD, the Altera EP1210. The EPLD may be erased and re-programmed to implement different temperature control strategies.

While the invention has been described and disclosed with reference to limited number of embodiments, it will be apparent that variations and modifications may be made therein, and it is therefore intended in the following claims to cover each such variation and modification as falls within the true spirit and scope of the invention.

We claim:

1. A sensing system for producing an output signal responsive to the drop of the amplitude of a cyclic voltage below a determined level, comprising a source of a cyclic signal, a timing circuit having an input circuit and an output terminal, a threshold circuit, means coupling said output terminal and said source to said threshold circuit as first and second inputs thereto, said threshold circuit being responsive to the sum of the voltage at said output terminal and the instantaneous voltage of said source above a first predetermined level for applying triggering signals to said input circuit of said timing circuit, said timing circuit comprising means responsive to said triggering signal for maintaining said output terminal at a level exceeding a second predetermined level for a predetermined time, whereby in the absence of the occurrence of a peak of said cyclic voltage exceeding a third predetermined level for said predetermined time the voltage at said output terminal assumes a level less than said second predetermined level.

2. The sensing system of claim 1 wherein said timing circuit comprises monostable multivibrator.

3. The sensing system of claim 1 wherein said predetermined time is substantially 2 half cycles of said cyclic voltage.

4. The sensing system of claim 1 wherein said cyclic voltage is a full wave rectified voltage.

5. In a power supply system including an input circuit for receiving alternating current power, a power supply for converting alternating current power received by said input circuit to direct current power, and a circuit for applying the alternating current output of said input circuit to said power supply, the improvement wherein said applying circuit comprises a solid state relay having a circuit interconnecting said input circuit and power supply and a control circuit, said system further comprising first sensing means for producing a first output signal when the voltage of the output of said input circuit is outside of a determined range, and means for applying said first signal to said control circuit for disconnecting said power supply from said input circuit when said voltage output of said input circuit is outside of said range.

6. The power supply system of claim 5 wherein said control circuit comprises a control diode, said means for applying said first signal comprising means for applying said first signal to one electrode of said control diode.

7. The power supply system of claim 6 wherein said input circuit comprises means for applying a.c. to said solid state relay, and further comprising means for rectifying said a.c., and means deriving a voltage from said rectifying means for application to the other electrode of said control diode.

8. The power supply system of claim 7 wherein said means deriving a voltage comprises constant voltage dropping means, whereby said diode is cut off when said rectified voltage drops below a predetermined level.

9. The power supply system of claim 8 further comprising voltage regulating means connected to receive said rectified voltage for providing operating voltage for said sensing means.

10. In a power supply system including an input circuit for receiving alternating current input power, a power supply for converting alternating current power received by said input circuit to direct current power, and a circuit for applying the output of said input circuit to said power supply, the improvement wherein said applying circuit comprises a solid state relay having a circuit interconnecting said input circuit and power supply and a control device for controlling said interconnecting circuit, said system further comprising means for deriving a direct voltage control voltage from said input circuit proportional to the amplitude of said alternating current input power, a control circuit for producing a first signal responsive to the amplitude of said control voltage, and means applying said first signal to one terminal of said control device for controlling said solid state relay.

11. In a power supply system including an input circuit for receiving alternating current input power, a power supply for converting alternating current power received by said input circuit to direct current power, and a circuit for applying the output of said input circuit to said power supply, the improvement wherein said applying circuit comprises a solid state relay having a circuit interconnecting said input circuit and power supply and a control device for controlling said interconnecting circuit, said system further comprising means for deriving a control voltage from said input circuit responsive to the amplitude of said alternating current input power, a control circuit for producing a first signal responsive to the amplitude of said control voltage, and means applying said first signal to one terminal of said control device for controlling said solid state relay, said system further comprising a regulating circuit for supplying operating power to said control circuit, a rectifying circuit for rectifying said alternating power to produce a d.c. voltage supply for said regulating circuit, and a constant voltage dropping means for applying said d.c. voltage to the other terminal of said control device, whereby said control device is cutoff whenever said d.c. voltage is too low to enable proper operation of said regulating circuit.

12. In a power supply system including an input circuit for receiving alternating current input power, a power supply for converting alternating current power received by said input circuit to direct current power, and a circuit for applying the output of said input circuit to said power supply, the improvement wherein said applying circuit comprises a solid state relay having a circuit interconnecting said input circuit and power supply and a control device for controlling said interconnecting circuit, said system further comprising means for deriving a control voltage from said input circuit responsive to the amplitude of said alternating current input power, a control circuit for producing a first signal responsive to the amplitude of said control voltage, and means applying said first signal to one terminal of said control device for controlling said solid state relay, said control circuit comprising first and second transformers coupled to receive said alternating power, first and second rectifying circuits for rectifying the output of said first and second transformers respectively, sensing circuit means coupled to said first rectifying circuit for deriving said first signal, and means coupled to said second rectifying circuit for deriving operating voltage for said control circuit.

13. The power supply system of claim 12 wherein said control circuit further comprises means for generating control signals responsive to said alternating power being outside of a determined range.

14. In a power supply system including an input circuit for receiving alternating current input power, a power supply for converting alternating current power received by said input circuit to direct current power, and a circuit for applying the output of said input circuit to said power supply, the improvement wherein said applying circuit comprises a solid state relay having a circuit interconnecting said input circuit and power supply and a control device for controlling said interconnecting circuit, said system further comprising means for deriving a control voltage from said input circuit responsive to the amplitude of said alternating current input power, a control circuit for producing a first signal responsive to the amplitude of said control voltage, and means applying said first signal to one terminal of said control device for controlling said solid state relay, said control circuit comprising means for inhibiting the cutting off of said control device for a predetermined time following initial application of alternating input power to said power supply system.

15. In a power supply system including an input circuit for receiving alternating current input power, a power supply for converting alternating current power received by said input circuit to direct current power, and a circuit for applying the output of said input circuit to said power supply, the improvement wherein said applying circuit comprises a solid state relay having a circuit interconnecting said input circuit and power supply and a control device for controlling said interconnecting circuit, said system further comprising means for deriving a control voltage from said input circuit responsive to the amplitude of said alternating current input power, a control circuit for producing a first signal responsive to the amplitude of said control voltage, and means applying said first signal to one terminal of said control device for controlling said solid state relay, said control circuit further comprising on-off switch means connected to inhibit energization of said control device without inhibiting application of alternating power to said solid state relay.

* * * * *